(12) United States Patent
Hu et al.

(10) Patent No.: US 11,438,425 B2
(45) Date of Patent: Sep. 6, 2022

(54) METHOD, DEVICE AND SYSTEM FOR IDENTIFYING APPLICATION IDENTIFIER

(71) Applicant: HUAWEI TECHNOLOGIES CO., LTD., Guangdong (CN)

(72) Inventors: Xiang Hu, Beijing (CN); Yuan Xia, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/100,120

(22) Filed: Nov. 20, 2020

(65) Prior Publication Data
US 2021/0075868 A1  Mar. 11, 2021

Related U.S. Application Data

(63) Continuation of application No. PCT/CN2019/087688, filed on May 20, 2019.

(30) Foreign Application Priority Data

May 22, 2018 (CN) .......................... 201810496716.3

(51) Int. Cl.
  *H04L 29/08* (2006.01)
  *H04L 67/146* (2022.01)
  *H04L 47/12* (2022.01)
(52) U.S. Cl.
  CPC ............ *H04L 67/146* (2013.01); *H04L 47/12* (2013.01)
(58) Field of Classification Search
  CPC ............................... H04L 67/146; H04L 47/12
  (Continued)

(56) References Cited

U.S. PATENT DOCUMENTS

2007/0058632 A1\* 3/2007 Back ....................... H04L 43/00
                                                         370/392
2013/0103716 A1\* 4/2013 Yamagishi ......... H04N 21/8358
                                                         707/770
(Continued)

FOREIGN PATENT DOCUMENTS

CN        102318291 A        1/2012
CN        105591973 A        5/2016
(Continued)

OTHER PUBLICATIONS

3GPP TR 23.787 V0.3.0 (Apr. 2018),3rd Generation Partnership Project;Technical Specification Group Services and System Aspects;Study on encrypted traffic detection and verification(Release 16),Total 38 Pages.

(Continued)

*Primary Examiner* — Obaidul Huq
(74) *Attorney, Agent, or Firm* — Womble Bond Dickinson (US) LLP

(57) ABSTRACT

Embodiments of this application disclose a method and system for identifying an application identifier (APP ID), and a device. The method includes: receiving, by a packet flow description function network element, a query request that carries a signature parameter of a service data flow; determining an APP ID corresponding to a PFD that matches the signature parameter of the service data flow, as an APP ID corresponding to the service data flow; and sending a query response that carries the APP ID corresponding to the service data flow. The method provided in the embodiments of this application is applicable to APP ID identification.

17 Claims, 6 Drawing Sheets

(58) Field of Classification Search
USPC .................................................. 370/229, 230
See application file for complete search history.

(56) References Cited

U.S. PATENT DOCUMENTS

| | | | |
|---|---|---|---|
| 2018/0069798 A1* | 3/2018 | Bacik | H04L 43/026 |
| 2021/0051071 A1* | 2/2021 | Puente Pestana | H04M 15/44 |

FOREIGN PATENT DOCUMENTS

| | | |
|---|---|---|
| CN | 106385402 A | 2/2017 |
| CN | 107222369 A | 9/2017 |
| CN | 104995891 B | 12/2018 |
| WO | 2017173897 A1 | 10/2017 |
| WO | 2018064826 A1 | 4/2018 |

OTHER PUBLICATIONS

S2-163329 Ericsson,"Management of PFDs to PCEF/TDF",3GPP TSG-SA2 Meeting #116,11 Jul. 15, 2016, Vienna, Austria,total 9 pages.
S2-182208 Intel,"Solution of Encrypted Traffic Detection for key issue#1 with agreement between AF and MNO",SA WG2 Meeting #S2-126,Feb. 26 Mar. 2, 2018, Montreal, Canada,total 4 pages.
S2-177263 Nokia,"TS 23.503: PDF management descriptions",SA WG2 Meeting #123 ,23 Oct. 27, 2017, Ljubljana, Slovenia,total 4 pages.
S2-178083 Nokia,"TS 23.503: PDF management descriptions",SA WG2 Meeting #123 ,23 Oct. 27, 2017, Ljubljana, Slovenia,total 4 pages.
3GPP TS 23.503 V15.1.0 (Mar. 2018),3rd Generation Partnership Project;Technical Specification Group Services and System Aspects;Policy and Charging Control Framework for the 5G System;Stage 2(Release 15),total 65 pages.
3GPP TS 23.503 V1.0.0 (Dec. 2017),3rd Generation Partnership Project;Technical Specification Group Services and System Aspects;Policy and Charging Control Framework for the 5G System;Stage 2(Release 15),total 56 pages.

* cited by examiner

METHOD, DEVICE AND SYSTEM FOR IDENTIFYING APPLICATION IDENTIFIER

CROSS-REFERENCE TO RELATED APPLICATIONS

This application is a continuation of International Patent Application No. PCT/CN2019/087668, filed on May 20, 2019, which claims priority to Chinese Patent Application No. 201810496716.3, filed on May 22, 2018. The disclosures of the aforementioned applications are hereby incorporated by reference in their entireties.

TECHNICAL FIELD

This disclosure relates to the field of communications technologies, and in particular, to a method and system for identifying an application identifier (APP ID), and a device.

BACKGROUND

The existing 3rd Generation Partnership Project (3GPP) TS 23.503 defines a method for identifying an APP ID in a 5th generation (5G) system. As shown in FIG. 1, the method may include: A packet flow description function (PFDF) is deployed in a network exposure function (NEF). The PFDF obtains packet flow descriptions (PFD) and APP IDs corresponding to the PFDs from different application functions (AF) or different application service providers (ASP). A session management function (SMF) obtains, from the PFDF, a PFD and an APP ID corresponding to the PFD, and delivers the PFD and the APP ID corresponding to the PFD to a user plane function (UPF). After receiving a service data flow, the UPF determines, based on the service data flow and the PFD that is obtained from the SMF, an APP ID corresponding to the service data flow, and then performs a corresponding action based on the identified APP ID. For example, the UPF finds, through matching, a policy and charging control (PCC) rule that carries the APP ID, and executes a policy corresponding to the PCC rule.

The AFs may be deployed by an operator or a third party, and each AF may generate a plurality of PFDs. Therefore, the PFDF may obtain an extremely large quantity of PFDs (there may be one million or tens of millions PFDs) from the different AFs. If the SMF delivers all the PFDs obtained by the PFDF to the UPF, the UPF uses relatively large storage space to store the PFDs. This increases storage pressure on the UPF. In addition, the UPF should perform matching on a large quantity of PFDs, to obtain a PFD that matches a signature parameter of the service data flow. This has great impact on processing capability of the UPF. Moreover, when an AF is dynamically deployed in a network, the newly deployed AF may send a new PFD to the PFDF, and the PFDF should synchronize the new PFD to the corresponding UPF in time through the SMF. This synchronization mechanism also consumes resources of the UPF.

SUMMARY

Embodiments of this disclosure provide a method and system for identifying an APP ID, and a device, to resolve a problem that a substantial quantity of resources of a UPF are consumed when an existing method for identifying an APP ID corresponding to a service data flow is used.

To achieve the foregoing objective, the following technical solutions are used in this disclosure.

According to an embodiment, a method for identifying an APP ID is provided. The method includes: A packet flow description function network element receives a query request that carries a signature parameter of a service data flow; determines an APP ID corresponding to a PFD that matches the signature parameter of the service data flow, as an APP ID corresponding to the service data flow; and sends a query response that carries the APP ID corresponding to the service data flow. According to this manner, the packet flow description function network element receives, from another network element, the signature parameter of the service data flow; determines the APP ID corresponding to the PFD that matches the received signature parameter of the service data flow, as the APP ID corresponding to the service data flow; and sends, to the another network element, the APP ID corresponding to the service data flow. In the method, an action of identifying the APP ID is performed by the packet flow description function network element, and the another network element is not required to perform the action. This reduces resource consumption of the another network element for identifying the APP ID.

In an embodiment, the packet flow description function network element matches the signature parameter of the service data flow with at least one PFD, to determine the PFD that matches the signature parameter of the service data flow; and determines, based on the matched PFD and a correspondence between a PFD and an APP ID, the APP ID corresponding to the matched PFD, and uses the APP ID corresponding to the matched PFD as the APP ID corresponding to the service data flow. According to this manner, the packet flow description function network element may first find the PFD that matches the signature parameter of the service data flow, then find the APP ID corresponding to the matched PFD based on the correspondence between the PFD and the APP ID, and use the APP ID as the APP ID corresponding to the service data flow.

In an embodiment, before matching the signature parameter of the service data flow with the at least one PFD, the packet flow description function network element determines that a correspondence between the signature parameter of the service data flow and an APP ID does not exist. In specific implementation, for example, the packet flow description function network element is a PFDF. The PFDF may maintain a correspondence list locally or in another external storage device. The correspondence list is used to record a correspondence that has been identified and that is between a signature parameter of a service data flow and an APP ID, or a correspondence that has been identified by the PFDF and that is between a hash value of a signature parameter of a service data flow and an APP ID. The correspondence list in an initial state may be empty, or may include some content predefined by an administrator, and the correspondence list may be dynamically maintained by the PFDF subsequently. For example, the correspondence list is used to record the correspondence between the signature parameter of the service data flow and the APP ID. After the PFDF identifies an APP ID corresponding to a service data flow, the PFDF may add a newly-identified correspondence between a signature parameter of the service data flow and the APP ID to the correspondence list. According to this manner, after receiving the query request, the PFDF first checks whether the correspondence between the signature parameter of the to-be-queried service data flow and the APP ID exists. If the correspondence between the signature parameter of the to-be-queried service data flow and an APP ID does not exist, it indicates that no APP ID corresponding to the service data flow has been identified. In this case, the PFDF should perform a matching operation. The PFDF matches the signature parameter of the service data flow with the at least one PFD, to determine the PFD that matches the signature parameter of the to-be-queried service data flow. Then, the PFDF determines, based on the matched PFD and the correspondence between the PFD and the APP ID, the APP ID corresponding to the matched PFD, and uses the APP ID corresponding to the matched PFD as the APP ID corresponding to the to-be-queried service data flow. On the contrary, if the correspondence between the signature parameter of the to-be-queried service data flow and the APP ID exists, the PFDF may directly use the APP ID as the APP ID corresponding to the to-be-queried service data flow, without performing PFD matching to search for the APP ID. This reduces processing consumption caused by the PFD matching.

In an embodiment, the packet flow description function network element stores a correspondence between the signature parameter of the service data flow and the determined APP ID. According to this manner, the packet flow description function network element may store a correspondence between an APP ID corresponding to a service data flow and a signature parameter corresponding to the service data flow. In this way, when the packet flow description function network element subsequently queries the APP ID corresponding to the service data flow, the packet flow description function network element can directly find, from the stored correspondence, the APP ID corresponding to the service data flow, without performing PFD matching. This reduces processing consumption caused by the PFD matching.

In an embodiment, the packet flow description function network element receives the query request from a user plane network element through a communications interface between the packet flow description function network element and the user plane network element, and sends the query response to the user plane network element through the communications interface. According to this manner, the packet flow description function network element receives or sends, through the communications interface between the packet flow description function network element and the user plane network element, information required for performing the method for identifying an APP ID provided in this disclosure. The packet flow description function network element does not need to interact with the user plane network element through another network element. This reduces signaling overheads caused by interaction between network elements, and this manner is simple and easy to implement.

In an embodiment, the packet flow description function network element receives the query request from a session management network element through a service-based interface between the packet flow description function network element and the session management network element, and sends the query response to the session management network element through the service-based interface. According to this manner, the packet flow description function network element receives or sends, through the service-based interface between the packet flow description function network element and the session management network element, information required for identifying an APP ID provided in this disclosure. The packet flow description function network element and the session management network element may directly interact with each other through a deployed network interface, and there is no need to change an existing network architecture.

In an embodiment, and the forwarding indication is used to indicate the session management network element to send, to a user plane network element, the APP ID corresponding to the service data flow. According to this manner, after receiving the query response, the session management network element may send, to the user plane network element, the APP ID that corresponds to the service data flow and that is included in the received query response.

In an embodiment, the packet flow description function network element is deployed in a network exposure function network element. According to this manner, a function network element that can perform the method for identifying an APP ID provided in this disclosure may be deployed in an existing network element, and there is no need to change an existing network deployment architecture. This manner is simple and easy to implement.

In an embodiment, the method further includes: The packet flow description function network element receives, from an application function network element, a PFD and an APP ID corresponding to the PFD, and stores a correspondence between the PFD and the APP ID that are received. According to this manner, the packet flow description function network element locally stores the received PFD and the received APP ID corresponding to the PFD, so that the packet flow description function network element directly searches, based on the correspondence that is between the PFD and the APP ID and that is stored by the packet flow description function network element, for the APP ID corresponding to the PFD that matches the signature parameter of the service data flow, without obtaining the correspondence between the PFD and the APP ID from another network element. This manner is simple and easy to implement.

In an embodiment, the query response corresponds to the query request, and the query response and the query request carry a same parameter (or a same string). According to this manner, the query request may be associated with the query response, to clearly distinguish between query responses corresponding to different query requests.

In an embodiment, the signature parameter of the service data flow includes one or a combination of the following information: a 5-tuple of the service data flow, a uniform resource locator of the service data flow, and a domain name of the service data flow. According to this manner, different types of information are used to represent the service data flow. This improves flexibility of the signature parameter used to represent the service data flow.

According to an embodiment, this disclosure provides a method for identifying an APP ID. The method includes: A session management network element receives a first request that carries a signature parameter of a service data flow and that is sent by a user plane network element; sends, to a packet flow description function network element, a query request that carries the signature parameter of the service data flow; receives a query response that carries an APP ID corresponding to the service data flow and that is sent by the packet flow description function network element; and sends, to the user plane network element, a first response that carries the APP ID corresponding to the service data flow. According to the method provided in this disclosure, the session management network element sends, to the packet flow description function network element, the signature parameter that is of the service data flow and that is sent by the user plane network element, and the packet flow description function network element determines the APP ID corresponding to the service data flow. In this process, an action of identifying the APP ID is performed by the packet flow description function network element, but not by the user plane network element. This reduces resource consumption of the user plane network element for identifying the APP ID. In addition, the method is performed based on an existing network deployment architecture, and there is no need to change the existing network deployment architecture. In other words, the method is compatible with an existing network.

In an embodiment, the session management network element sends the query request to the packet flow description function network element through a service-based interface between the session management network element and the packet flow description function network element, and receives, through the service-based interface, the query response sent by the packet flow description function network element. According to this manner, the session management network element receives or sends, through the service-based interface between the session management network element and the packet flow description function network element, information required for identifying an APP ID provided in this disclosure. There is no need to change an existing network architecture.

In an embodiment, the query response further carries a forwarding indication, and the forwarding indication is used to indicate the session management network element to send, to the user plane network element, the APP ID corresponding to the service data flow. According to this manner, after receiving the query response, the session management network element may send the APP ID corresponding to the service data flow through the first response to the user plane network element based on the forwarding indication.

In an embodiment, the query response corresponds to the query request, and the query response and the query request carry a same parameter (or a same string). According to this manner, the query request may be associated with the query response, to clearly distinguish between query responses corresponding to different query requests.

In an embodiment, the signature parameter of the service data flow includes one or a combination of the following information: a 5-tuple of the service data flow, a uniform resource locator of the service data flow, and a domain name of the service data flow. According to this manner, different types of information are used to represent the service data flow. This improves flexibility of the signature parameter used to represent the service data flow.

According to an embodiment, this disclosure provides a method for identifying an APP ID. The method includes: A user plane network element sends, to a packet flow description function network element, a query request that carries a signature parameter of a service data flow; and receives a query response that carries an APP ID corresponding to the service data flow and that is sent by the packet flow description function network element. According to the method provided in this disclosure, the user plane network element directly sends the signature parameter of the service data flow to the packet flow description function network element, and receives the APP ID that corresponds to the service data flow and that is sent by the packet flow description function network element. In this process, an action of identifying the APP ID is performed by the packet flow description function network element, but not by the user plane network element. This reduces resource consumption of the user plane network element for identifying the APP ID. In addition, the UPF does not need to store a PFD and a correspondence between a PFD and an APP ID. This reduces storage pressure on the UPF. Moreover, the user plane network element does not need to use another network element to interact with the packet flow description function network element. This reduces signaling overheads caused by interaction between network elements.

In an embodiment, the user plane network element sends the query request to the packet flow description function network element through a communications interface between the user plane network element and the packet flow description function network element, and receives the query response through the communications interface. According to this manner, the user plane network element receives or sends, through the communications interface between the user plane network element and the packet flow description function network element, information required for identifying an APP ID provided in this disclosure. This manner is simple and easy to implement.

In an embodiment, the user plane network element stores a correspondence between the received APP ID corresponding to the service data flow and a signature value of the service data flow. The signature value is used to represent the service data flow, and the signature value is the signature parameter of the service data flow or a value obtained through calculation performed on the signature parameter of the service data flow based on an algorithm. According to this manner, when receiving a same type of service data flow again, the user plane network element may determine, based on the stored correspondence between an APP ID and the signature value, the APP ID corresponding to the service data flow, without interacting with the packet flow description function network element again. This reduces burden caused by signaling interaction between the network elements, and burden caused by querying the APP ID by the packet flow description function network element.

In an embodiment, before sending the query request to the packet flow description function network element, the user plane network element checks whether the user plane network element should execute a policy (for example, a PCC rule) associated with the APP ID. If the user plane network element should execute the policy associated with the APP ID, the user plane network element determines that the user plane network element should identify the APP ID corresponding to the service data flow, and sends the query request to the packet flow description function network element. According to this manner, when the user plane network element should identify the APP ID corresponding to the service data flow, the user plane network element may send the query request to the packet flow description function network element. This avoids signaling interaction burden caused by blindly sending the query request to the packet flow description function network element.

In an embodiment, the query response corresponds to the query request, and the query response and the query request carry a same parameter (or a same string). According to this manner, the query request may be associated with the query response, to clearly distinguish between query responses corresponding to different query requests.

In an embodiment, the signature parameter of the service data flow includes one or a combination of the following information: a 5-tuple of the service data flow, a uniform resource locator of the service data flow, and a domain name of the service data flow.

According to an embodiment, this disclosure provides a packet flow description function network element. The packet flow description function network element may implement functions performed by the packet flow description function network element in various embodiments. The functions may be implemented by hardware, or may be implemented by hardware executing corresponding software. The hardware or the software includes one or more modules corresponding to the functions. For example, the packet flow description function network element may include a receiving unit, an identification unit, and a sending unit.

The receiving unit is configured to receive a query request that carries a signature parameter of a service data flow. The identification unit is configured to determine an APP ID corresponding to a PFD that matches the signature parameter of the service data flow, as an APP ID corresponding to the service data flow. The sending unit is configured to send a query response that carries the APP ID corresponding to the service data flow.

For a specific implementation of the packet flow description function network element, refer to the packet flow description function network element in the method for identifying an APP ID in some of the embodiments described herein. Details are not described herein again. Therefore, the provided packet flow description function network element can achieve a beneficial effect the same as that achieved in various embodiments.

According to an embodiment, a packet flow description function network element is provided, including a processor and a memory. The memory is configured to store a computer-executable instruction. When the packet flow description function network element runs, the processor executes the computer-executable instruction stored in the memory, to enable the packet flow description function network element to perform the method for identifying an APP ID in various embodiments.

According to an embodiment, a computer-readable storage medium is provided. The computer-readable storage medium stores an instruction, and when the instruction is run on a computer, the computer is enabled to perform the method for identifying an APP ID in various embodiments.

According to an embodiment, a computer program product including an instruction is provided. When the computer program product runs on a computer, the computer is enabled to perform the method for identifying an APP ID in various embodiments.

According to an embodiment, a chip system is provided. The chip system includes a processor and a communications interface, and the processor and the communications interface are configured to support a packet flow description function network element in implementing functions in various embodiments. For example, the processor receives, through the communications interface, a query request that carries a signature parameter of a service data flow; determines an APP ID corresponding to a PFD that matches the signature parameter of the service data flow, as an APP ID corresponding to the service data flow; and sends, through the communications interface, a query response that carries the APP ID corresponding to the service data flow. In a possible design, the chip system further includes a memory, and the memory is configured to store a program instruction and data that are necessary for the packet flow description function network element. The chip system may include a chip, or may include a chip and another discrete component.

For a technical effect achieved in some embodiments described herein, refer to the technical effect achieved in various embodiments. Details are not described herein again.

According to an embodiment, this disclosure provides a session management network element. The session management network element may implement functions performed by the session management network element in any various embodiments. The functions may be implemented by hardware, or may be implemented by hardware executing corresponding software. The hardware or the software includes one or more modules corresponding to the functions. For example, the session management network element may include a receiving unit and a sending unit.

The receiving unit is configured to receive a signature parameter of a service data flow, where the signature parameter of the service data flow is sent by a user plane network element. The sending unit is configured to send, to a packet flow description function network element, a query request that carries the signature parameter of the service data flow. The receiving unit is further configured to receive a query response that carries an APP ID corresponding to the service data flow and that is sent by the packet flow description function network element. The sending unit is further configured to send, to the user plane network element, a first response that carries the APP ID corresponding to the service data flow.

For a specific implementation of the session management network element, refer to the session management network element in the method for identifying an APP ID in various embodiments. Details are not described herein again. Therefore, the provided session management network element can achieve a beneficial effect the same as that achieved in various embodiments.

According to an embodiment, a session management network element is provided, including a processor and a memory. The memory is configured to store a computer-executable instruction. When the session management network element runs, the processor executes the computer-executable instruction stored in the memory, to enable the session management network element to perform the method for identifying an APP ID in various embodiments.

According to an embodiment, a computer-readable storage medium is provided. The computer-readable storage medium stores an instruction, and when the instruction is run on a computer, the computer is enabled to perform the method for identifying an APP ID in various embodiments.

According to an embodiment, a computer program product including an instruction is provided. When the computer program product runs on a computer, the computer is enabled to perform the method for identifying an APP ID in any one of the second aspect or the possible designs of the second aspect.

According to an embodiment, a chip system is provided. The chip system includes a processor and a communications interface, and the processor and the communications interface are configured to support a session management network element in implementing functions in various embodiments. For example, the processor receives, through the communications interface, a first request that carries a signature parameter of a service data flow and that is sent by a user plane network element; sends, to a packet flow description function network element through the communications interface, a query request that carries the signature parameter of the service data flow; receives, through the communications interface, a query response that carries an APP ID corresponding to the service data flow and that is sent by the packet flow description function network element; and sends, to the user plane network element through the communications interface, a first response that carries the APP ID corresponding to the service data flow. In a possible design, the chip system further includes a memory. The memory is configured to store a program instruction and data that are necessary for the session management network element. The chip system may include a chip, or may include a chip and another discrete component.

Various embodiments described herein may provide various technical effects. Details are not described herein again.

According to an embodiment, this disclosure provides a user plane network element. The user plane network element may implement functions performed by the user plane network element in various embodiments. The functions may be implemented by hardware, or may be implemented by hardware executing corresponding software. The hardware or the software includes one or more modules corresponding to the functions. For example, the user plane network element may include a sending unit and a receiving unit.

The sending unit is configured to send, to a packet flow description function network element, a query request that carries a signature parameter of a service data flow. The receiving unit is configured to receive a query response that carries an APP ID corresponding to the service data flow and that is sent by the packet flow description function network element.

For a specific implementation of the user plane network element, refer to the user plane network element in the method for identifying an APP ID in various embodiments. Details are not described herein again. Therefore, the provided user plane network element can achieve a beneficial effect the same as that achieved in various embodiments.

According to an embodiment, a user plane network element is provided, including a processor and a memory. The memory is configured to store a computer-executable instruction. When the user plane network element runs, the processor executes the computer-executable instruction stored in the memory, to enable the user plane network element to perform the method for identifying an APP ID in various embodiments.

According to an embodiment, a computer-readable storage medium is provided. The computer-readable storage medium stores an instruction, and when the instruction is run on a computer, the computer is enabled to perform the method for identifying an APP ID in various embodiments.

According to an embodiment, a computer program product including an instruction is provided. When the computer program product runs on a computer, the computer is enabled to perform the method for identifying an APP ID in various embodiments.

According to an embodiment, a chip system is provided. The chip system includes a processor and a communications interface, and the processor and the communications interface are configured to support a user plane network element in implementing functions in the foregoing embodiments. For example, the processor sends, to a packet flow description function network element through the communications interface, a query request that carries a signature parameter of a service data flow; and receives, through the communications interface, a query response that carries an APP ID corresponding to the service data flow and that is sent by the packet flow description function network element. In a possible design, the chip system further includes a memory. The memory is configured to store a program instruction and data that are necessary for the user plane network element. The chip system may include a chip, or may include a chip and another discrete component.

Various embodiments described herein may provide various technical effects. Details are not described herein again.

According to an embodiment, a system for identifying an APP ID is provided, including the packet flow description function network element in various embodiments and a first network element.

The first network element is configured to send, to the packet flow description function network element, a query request that carries a signature parameter of a service data flow. The packet flow description function network element is configured to: receive the query request; determine an APP ID corresponding to a PFD that matches the signature parameter of the service data flow as an APP ID corresponding to the service data flow; and send a query response to the first network element, where the query response carries the APP ID corresponding to the service data flow. The first network element is further configured to receive the query response. Based on the system for identifying an APP ID provided in this disclosure, the first network element sends the query request to the packet flow description function network element, and the packet flow description function network element queries the APP ID corresponding to the service data flow and feeds back the APP ID to the first network element. In other words, the packet flow description function network element performs a function of identifying the APP ID, and the first network element does not need to store a PFD and a correspondence between a PFD and an APP ID, and does not need to find, through matching, the PFD corresponding to the signature parameter of the service data flow. This reduces resource consumption of the first network element.

In an embodiment, the first network element is the session management network element according to various embodiments. Details are not described again. The system for identifying an APP ID further includes a user plane network element.

In an embodiment, the first network element is the user plane network element according to one or more of the embodiment described herein. Details are not described again.

DESCRIPTION OF EMBODIMENTS

A method for identifying an APP ID provided in this disclosure is as follows: A packet flow description function network element centrally manages PFDs and APP IDs corresponding to the PFDs, and supports a network device in querying the APP ID. For example, when a user plane function network element should query an APP ID corresponding to a service data flow, the user plane function network element may directly send a signature parameter of the service data flow to the packet flow description function network element or send a signature parameter of the service data flow to the packet flow description function network element through a session management network element, and the packet flow description function network element determines a PFD that matches the signature parameter of the service data flow, and queries the APP ID corresponding to the service data flow based on the matched PFD. There is no need to deliver, to the user plane function network element, all PFDs and APP IDs corresponding to the PFDs, where the PFDs and the APP IDs corresponding to the PFDs are obtained by the packet flow description function network element. This avoids storage pressure caused to the user plane function network element because the user plane function network element stores a large quantity of PFDs, and avoids resource consumption caused by PFD update. In addition, the user plane function network element does not need to find, by matching a large quantity of PFDs with the signature parameter of the service data flow, the PFD corresponding to the signature parameter of the service data flow. This reduces processing consumption caused by PFD matching.

The following describes the method provided in the embodiments of this disclosure with reference to the accompanying drawings.

Figure 1:
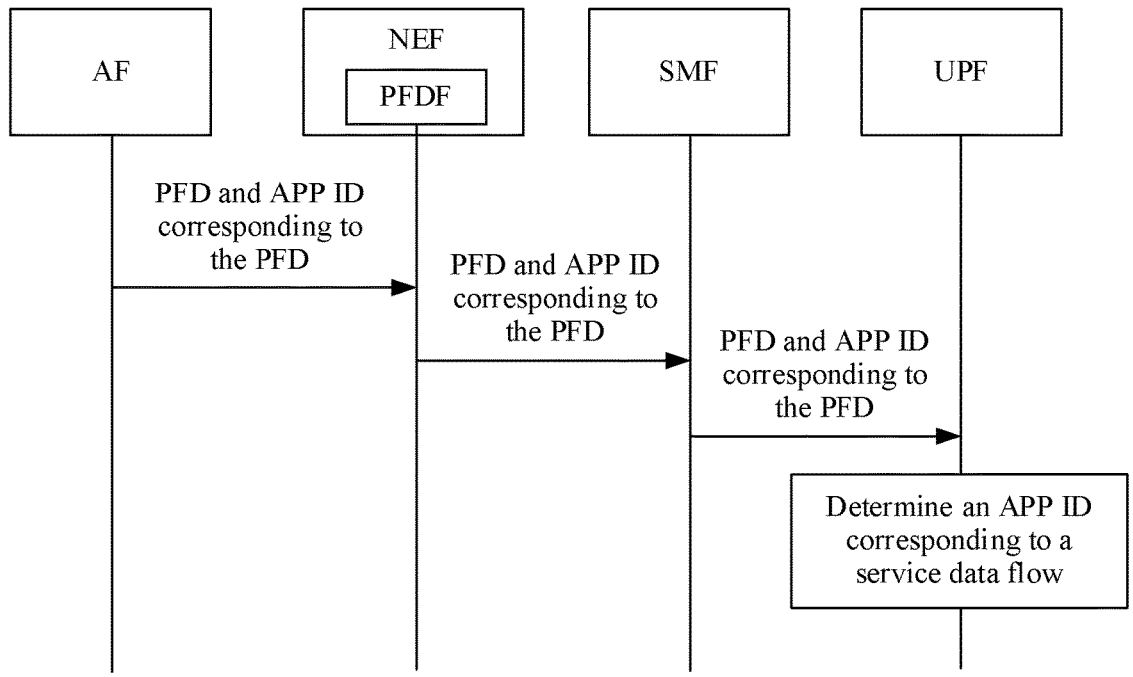
FIG. 1 is a flowchart of an existing method for identifying an APP ID.
Figure 2:
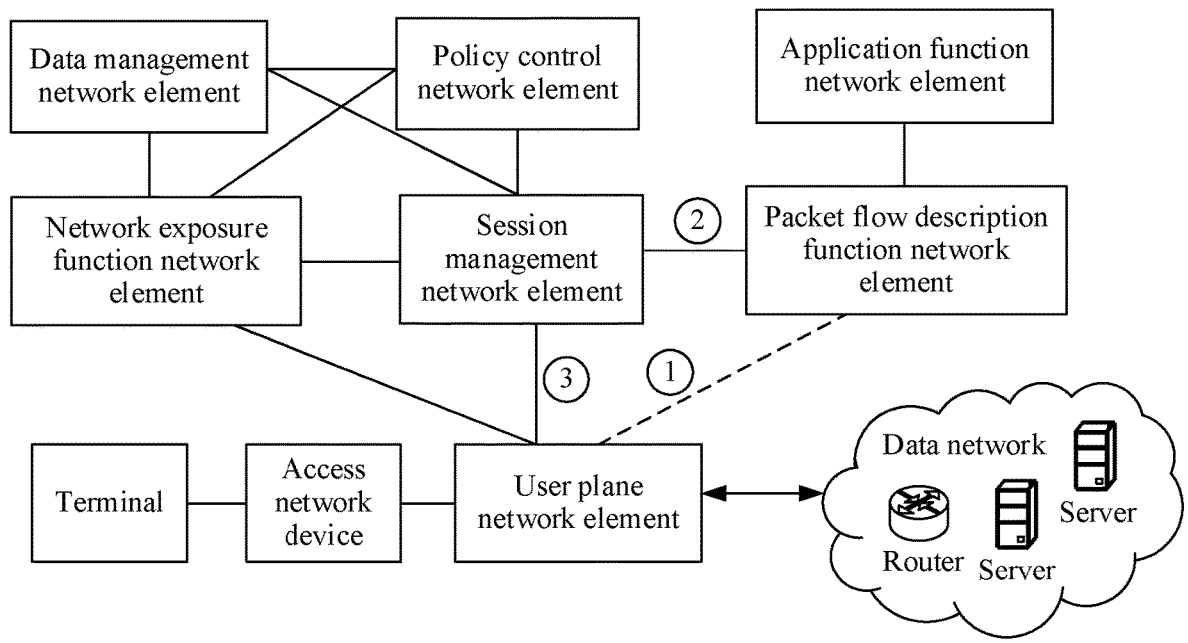
FIG. 2 is a simplified schematic diagram of a system architecture according to an embodiment of this disclosure.

The method for identifying an APP ID provided in the embodiments of this disclosure may be applied to a communications system shown in FIG. 2. As shown in FIG. 2, the communications system may include a session management network element, a user plane network element, a packet flow description function network element, and an application function network element. Optionally, the communications system may further include a terminal, an access network device, a policy control network element, a network exposure function network element, a data management network element, and a data network (DN). It should be noted that FIG. 2 is merely an example architectural diagram. In addition to the network elements shown in FIG. 2, the communications system may further include another network element, for example, a mobility management network element configured to manage mobility of the terminal. In addition, there may be another connection relationship between the network elements, and an interface between the network elements may have another name. For example, FIG. 4.2.3-1 in TS 23.501 shows another possible architectural diagram. This is not limited in the embodiments of this disclosure.

The session management network element in FIG. 2 may manage one or more user plane network elements, and is mainly configured to implement session management functions such as establishment, release, and/or change of a user plane transmission path.

The user plane network element in FIG. 2 may be used as an anchor on a user plane transmission path, and is mainly configured to perform functions such as routing and forwarding of user plane data. For example, the user plane network element establishes a channel (namely, the user plane transmission path) between the user plane network element and the terminal, forwards a data packet between the terminal and the DN on the channel, and is responsible for data packet filtering, data transmission/forwarding, rate control, generation of charging information, and the like for the terminal.

The packet flow description function network element in FIG. 2 may be a PFDF, and is mainly configured to: store a PFD and an APP ID corresponding to the PFD, and support APP ID query and the like. The packet flow description function network element may interact with the user plane network element through a path ① shown in FIG. 2 or through paths ② and ③ shown in FIG. 2. For example, when the user plane network element determines that the user plane network element should query an APP ID corresponding to a service data flow, the user plane network element may send a signature parameter of the service data flow to the packet flow description function network element through the path ① or the paths ① and ③. The packet flow description function network element uses an APP ID corresponding to a PFD that matches the signature parameter of the service data flow, as the APP ID corresponding to the service data flow, and feeds back the determined APP ID to the user plane network element through the path ① or the paths ① and ③. The packet flow description function network element may be independently deployed in the communications system shown in FIG. 2, or may be deployed in a network element in the communications system shown in FIG. 2. For example, the packet flow description function network element may be deployed in the network exposure function network element or another network element. This is not limited in this disclosure. It should be noted that, the PFD and the APP ID corresponding to the PFD may alternatively be stored in the data management network element.

The application function network element in FIG. 2 may be referred to as an application function (AF) or an application service provider (ASP), and is mainly configured to provide a PFD and an APP ID corresponding to the PFD for another network device (for example, the packet flow description function network element).

The data management network element in FIG. 2 may be a unified data repository (UDR), and is mainly configured to buffer information such as user data (UD), user policy data, and capability exposure data. Optionally, the data management network element may further store data such as the PFD and the APP ID corresponding to the PFD.

Figure 2A:
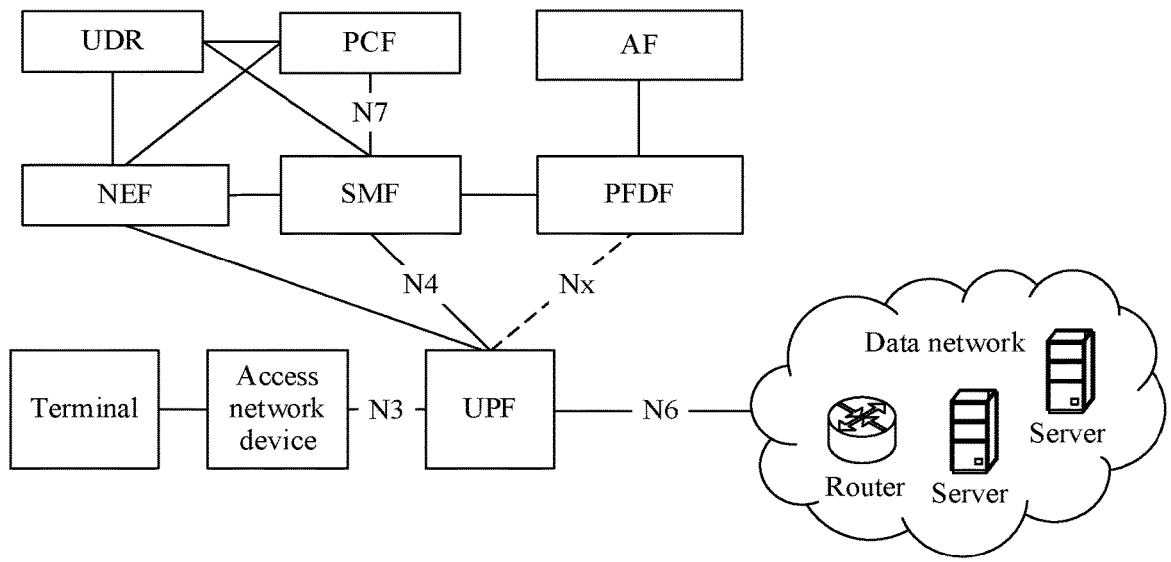
FIG. 2*a* is a simplified schematic diagram of a 5G system according to an embodiment of this disclosure.
Figure 2B:
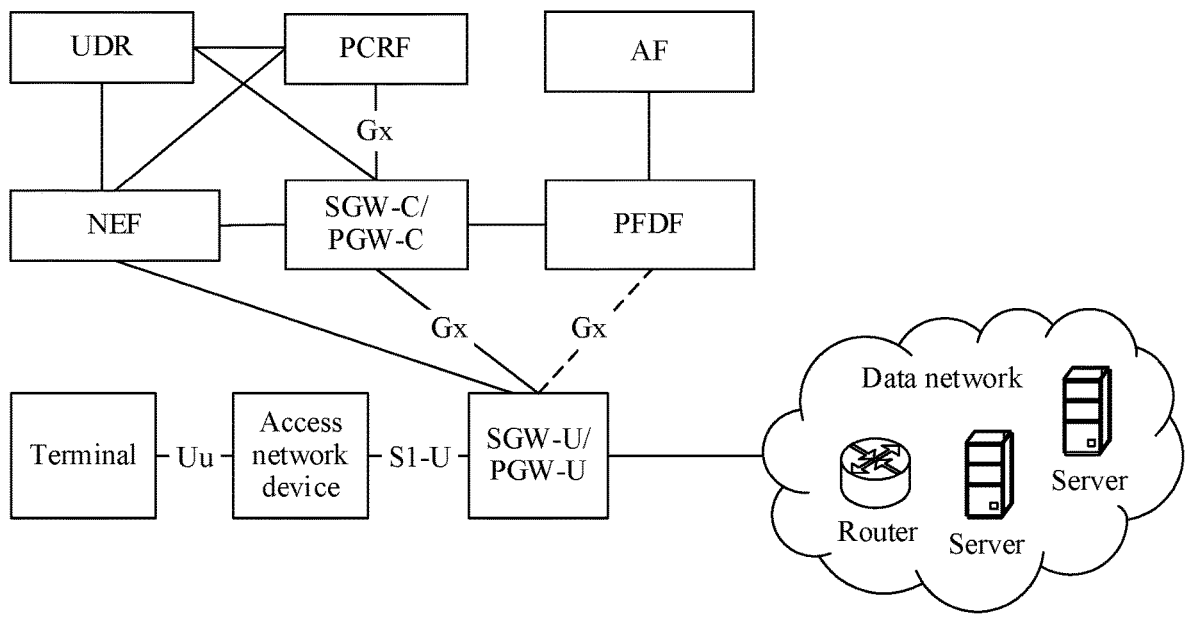
FIG. 2*b* is a simplified schematic diagram of a 4G system according to an embodiment of this disclosure.

Specifically, the communications system shown in FIG. 2 may be a 5th generation (5G) system shown in FIG. 2a, or a 4th generation (4G) system (for example, an evolved packet system (evolved packet system, EPS)) shown in FIG. 2b, or another actual system, for example, a next generation communications system. This is not limited in this disclosure.

When the communications network shown in FIG. 2 is the 5G system shown in FIG. 2a, the session management network element in FIG. 2 may be a session management function (SMF), the policy control network element in FIG. 2 may be a policy control function (PCF), the user plane network element in FIG. 2 may be a user plane function (UPF), the network exposure function network element in FIG. 2 may be a network exposure function (NEF), and the data management network element in FIG. 2 may be unified data management (UDM). As shown in FIG. 2a, a connection between the network elements may be established through a next generation (NG) interface to implement communication. For example, a user plane data connection may be established between an access network device and the UPF through an NG interface 3 (N3 for short); a control plane signaling connection may be established between the UPF and the SMF through an NG interface 4 (N4 for short); user plane data may be exchanged between the UPF and a data network through an NG interface 6 (N6 for short); a control plane signaling connection may be established between the SMF and the PCF through an NG interface 7 (N7 for short); and a control plane signaling connection may be directly established between a PFDF and the UPF through a newly-added NG interface x (Nx for short) (not defined currently), or a control plane signaling connection may be established between a PFDF and the SMF through a service-based interface (such as an Npfdf interface), and then the PFDF may interact with the UPF through the SMF. In this embodiment of this disclosure, the Nx interface and the service-based interface support a message in a hypertext transfer protocol (HTTP) form. It should be noted that FIG. 2a is merely an example architectural diagram. In addition to the network elements shown in FIG. 2a, the 5G system may further include another network element. This is not limited in the embodiments of this disclosure.

When the communications network shown in FIG. 2 is the 4G system shown in FIG. 2b, the session management network element in FIG. 2 may be a serving gateway for control plane (SGW-C)/public data network gateway for control plane (PGW-C) or may be a traffic detection function for control plane (TDF-C) network element, the policy control network element in FIG. 2 may be a policy and charging rules function (PCRF), and the user plane network element in FIG. 2 may be a serving gateway for user plane (SGW-U)/public data network gateway for user plane (PGW-U) or may be a traffic detection function for user plane (TDF-U) network element. As shown in FIG. 2b, an air interface connection may be established between a terminal and an access network device through a Uu interface; a user plane data connection may be established between the access network device and the SGW-U/PGW-U through an S1-U interface; a control plane signaling connection may be established between the SGW-U/PGW-U and the SGW-C/PGW-C through a Gx interface; a control plane signaling connection may be established between the SGW-C/PGW-C and the PCRF through a Gx interface; and a control plane signaling connection may be established between a PFDF and the SGW-C/PGW-C through a service-based interface, and then the PFDF may interact with the SGW-U/PGW-U through the SGW-C/PGW-C, or a control plane signaling connection may be directly established between a PFDF and the SGW-U/PGW-U through a newly-added communications interface. It should be noted that, the SGW-C/PGW-C and the SGW-U/PGW-U in FIG. 2b may be independently deployed in the 4G system as shown in FIG. 2b, or may be integrated into a same network element (such as an SGW/PGW/TDF). Moreover, FIG. 2b is merely an example architectural diagram. In addition to the network elements shown in FIG. 2b, the network architecture may further include another network element such as a mobility management entity (MME). This is not limited in the embodiments of this disclosure.

It should be noted that, in the foregoing architectures, names of the network elements and names of the interfaces between the network elements are merely examples, and the network elements and the interfaces between the network elements may have other names in specific implementation. This is not specifically limited in the embodiments of this disclosure.

Figure 3:
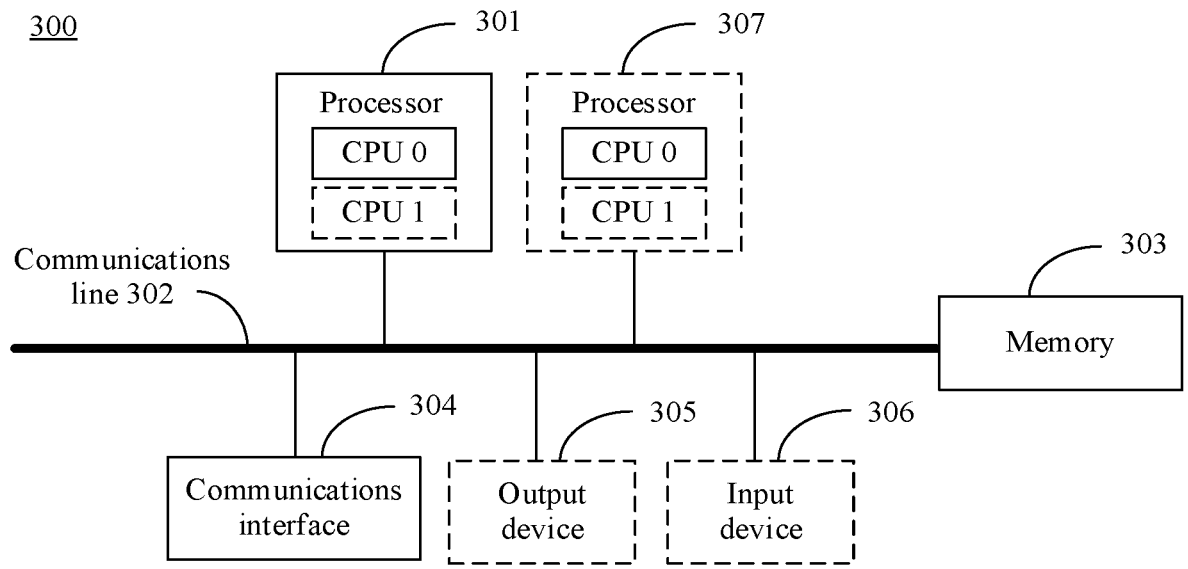
FIG. 3 is a schematic diagram of composition of a communications device according to an embodiment of this disclosure.

Specifically, to implement the method for identifying an APP ID provided in the embodiments of this disclosure, the session management network element, the user plane network element, the packet flow description function network element, and the like in FIG. 2 may include components shown in FIG. 3. FIG. 3 is a schematic diagram of composition of a communications device 300 according to an embodiment of this disclosure. As shown in FIG. 3, the communications device 300 includes at least one processor 301, a communications line 302, and at least one communications interface 304. The communications device 300 may further include a memory 303. The processor 301, the memory 303, and the communications interface 304 may be connected to each other through the communications line 302.

The processor 301 may be a central processing unit (CPU) or an application-specific integrated circuit (ASIC), or may be configured as one or more integrated circuits implementing the embodiments of this disclosure, for example, one or more digital signal processors (DSP) or one or more field programmable gate arrays (FPGA).

The communications line 302 may include a path, to transfer information between the foregoing components.

The memory 303 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 303 is not limited thereto. The memory 303 may exist independently, and is connected to the processor 301 through the communications line 302. Alternatively, the memory 303 may be integrated with the processor 301. The memory 303 is configured to store an execution instruction or application program code, and the processor 301 controls execution, to implement the method for identifying an APP ID provided in the following embodiments of this disclosure.

The communications interface 304 may be configured to communicate with another device or communications network, such as the Ethernet, a radio access network (RAN), or a wireless local area network (WLAN) through any apparatus such as a transceiver.

In a possible implementation, the processor 301 may include one or more CPUs, for example, a CPU 0 and a CPU 1 in FIG. 3. In another possible implementation, the communications device 300 may include a plurality of processors, for example, the processor 301 and a processor 307 in FIG. 3. In still another possible implementation, the communications device 300 may further include an output device 305 and an input device 306.

It should be noted that the communications device 300 may be a general-purpose device or a dedicated device. For example, the communications device 300 may be a desktop computer, a portable computer, a network server, a PDA, a mobile phone, a tablet computer, a wireless terminal, an embedded device, or a device with a structure similar to that in FIG. 3. A type of the communications device 300 is not limited in the embodiments of this disclosure.

The following describes, with reference to the communications system shown in FIG. 2, the method for identifying an APP ID provided in the embodiments of this disclosure.

Figure 4:
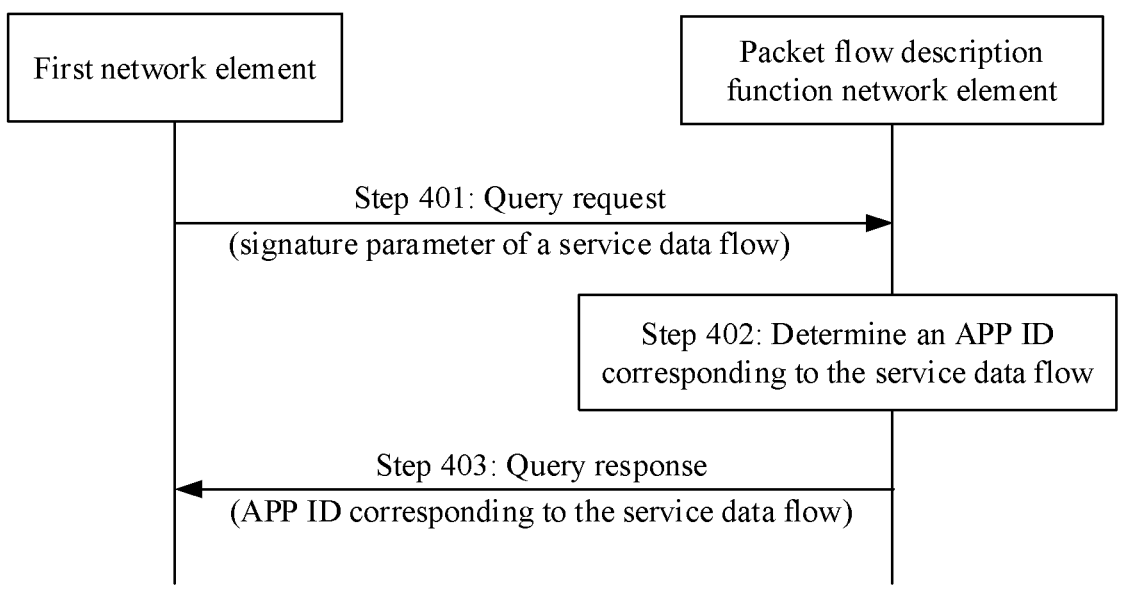
FIG. 4 is a flowchart of a method for identifying an APP ID according to an embodiment of this disclosure.

It should be noted that, names of messages or names of parameters in messages between network elements in the following embodiments of this disclosure are merely examples, and the messages or the parameters may have other names in specific implementation. This is not specifically limited in the embodiments of this disclosure. FIG. 4 is a flowchart of a method for identifying an APP ID according to an embodiment of this disclosure. The method is performed through interaction between a first network element and a packet flow description function network element, to identify an APP ID corresponding to a service data flow. In an example, the first network element is the user plane network element in FIG. 2, and the packet flow description function network element is the packet flow description function network element in FIG. 2. In another example, the first network element is the session management network element in FIG. 2, and the packet flow description function network element is the packet flow description function network element in FIG. 2. As shown in FIG. 4, the method includes block 401 to block 403.

Block 401: The first network element sends a query request to the packet flow description function network element.

The query request may carry a signature parameter of a service data flow, and the query request may be used to request the packet flow description function network element to query an APP ID corresponding to the service data flow.

In a possible design, the query request is used to request, in an implicit manner, the packet flow description function network element to query the APP ID corresponding to the service data flow. For example, the query request is a request of a special message type. The message type is used to indicate the packet flow description function network element to query the APP ID corresponding to the service data flow. After receiving the request of the message type, the packet flow description function network element obtains the signature parameter of the service data flow, and then queries, based on the signature parameter of the service data flow, the APP ID corresponding to the service data flow, where the signature parameter of the service data flow is carried in the query request.

In another possible design, the query request is used to request, in an explicit manner, the packet flow description function network element to query the APP ID corresponding to the service data flow. For example, the query request further carries indication information. The indication information is used to indicate the packet flow description function network element to query the APP ID corresponding to the service data flow. After receiving the query request, the packet flow description function network element determines, based on the indication information, that the first network element should query the APP ID corresponding to the service data flow. Then, the packet flow description function network element obtains the signature parameter of the service data flow, and queries, based on the signature parameter of the service data flow, the APP ID corresponding to the service data flow, where the signature parameter of the service data flow is carried in the query request. The query request may be specifically a session report request or a node report request.

In the embodiments of this disclosure, a signature parameter of a service data flow is used to describe the service data flow. The service data flow may be a service data flow received by a user plane network element. The signature parameter of the service data flow may include one or a combination of the following information: a 5-tuple of the service data flow, a uniform resource locator (URL) of the service data flow, and a domain name of the service data flow. For example, signature parameter of the service data flow may include the 5-tuple of the service data flow, the URL of the service data flow, the domain name of the service data flow, the 5-tuple of the service data flow and the URL of the service data flow, the 5-tuple of the service data flow and the domain name of the service data flow, the URL of the service data flow and the domain name of the service data flow, or the 5-tuple of the service data flow, the URL of the service data flow, and the domain name of the service data flow.

The 5-tuple of the service data flow may be used to identify a session to which the service data flow belongs. The 5-tuple of the service data flow may include an internet protocol (IP) address of a terminal and a port number of the terminal, and an IP address of a server that the terminal requests to access and a port number of the server, and a protocol type (for example, a protocol such as a user datagram protocol (UDP), a transmission control protocol (TCP), or a control message protocol (ICMP)). The URL of the service data flow is used to identify an address of a resource providing the service data flow. The domain of the service data flow is a name of a network element that sends the service data flow, and is used to identify the network element that sends the service data flow. In addition, the signature parameter of the service data flow may further include other information, such as user agent (User-Agent) information, a referrer URL, an application protocol name, a method, and a string that has a specific function and that is carried in another packet. This is not limited in this disclosure.

After receiving the service data flow, the user plane network element may obtain the signature parameter of the service data flow by using an existing detection method (for example, shallow packet inspection (SPI) or deep packet inspection (DPI)). When the first network element is the user plane network element, the user plane network element may directly send the obtained signature parameter of the service data flow through the query request to the packet flow description function network element. When the first network element is the session management network element, the session management network element may receive, from the user plane network element, the signature parameter of the service data flow, and send the received signature parameter of the service data flow through the query request to the packet flow description function network element.

Before the first network element sends the query request to the packet flow description function network element, the first network element may randomly select a packet flow description function network element from a packet flow description function network element list, or select a packet flow description function network element with lowest load, or select a packet flow description function network element closest to the first network element. Then, the first network element may send the query request to the selected packet flow description function network element. The packet flow description function network element list includes one or more packet flow description function network elements that support APP ID query, and the packet flow description function network element list may be preconfigured by an operator on the first network element. Alternatively, the first network element may obtain, from a network repository function (NRF), a packet flow description function network element to which the query request should be sent. Before the first network element sends the query request to the packet flow description function network element, the first network element sends a selection request to the NRF; and the NRF selects a packet flow description function network element, and feeds back the selected packet flow description function network element to the first network element. Then, the first network element sends the query request to the packet flow description function network element selected by the NRF. The NRF may select, based on a current working status (for example, a load or a processing capability) of each packet flow description function network element, a packet flow description function network element from one or more packet flow description function network elements that support APP ID query. Alternatively, the first network element may directly send the query request to a packet flow description function network element with which the first network element establishes a link connection function network element.

Specifically, the first network element may send the query request to the packet flow description function network element through a communications interface of the packet flow description function network element. For example, the first network element obtains an address of the communications interface of the packet flow description function network element, and sends the query request to the packet flow description function network element based on the address of the communications interface.

The communications interface of the packet flow description function network element is connected to a communications interface of the first network element, and the address of the communications interface of the packet flow description function network element may be preconfigured for the first network element. Alternatively, the communications interface may be resource-based. An address of the resource-based communications interface is a URL address, and the first network element may send a get request to the URL address, to query the APP ID corresponding to the service data flow.

Block 402: The packet flow description function network element receives the query request, and determines an APP ID corresponding to a PFD that matches the signature parameter of the service data flow, as the APP ID corresponding to the service data flow.

In a possible design, that the packet flow description function network element determines an APP ID corresponding to a PFD that matches the signature parameter of the service data flow, as the APP ID corresponding to the service data flow includes: The packet flow description function network element matches the signature parameter of the service data flow with at least one PFD, to determine the PFD that matches the signature parameter of the service data flow, where the signature parameter of the service data flow is carried in the query request; and determines, based on the matched PFD and a correspondence between a PFD and an APP ID, the APP ID corresponding to the matched PFD, and uses the APP ID corresponding to the matched PFD as the APP ID corresponding to the service data flow.

In the embodiments of this disclosure, a PFD is an information set used to detect a service data flow corresponding to an application, and may include a PFD identifier, one or more pieces of information (such as a protocol type, an IP address of a server side, and a port number of the server side) in the foregoing 5-tuple, a URL of the service data flow, a domain name of the service data flow, and the like. Generally, one application identifier may correspond to one or more PFDs, and each PFD may be uniquely identified by a PFD identifier. Matching the signature parameter of the service data flow with a PFD may include comparing information included in the signature parameter of the service data flow with information included in the PFD. If the information included in the signature parameter of the service data flow is the same as the information included in the PFD, or a similarity between the information included in the signature parameter of the service data flow and the information included in the PFD exceeds a preset threshold, it indicates that the PFD matches the signature parameter of the service data flow.

In the embodiments of this disclosure, a correspondence between a PFD and an APP ID may be recorded in a first correspondence list. The first correspondence list may include a plurality of records. Each record is used to record an APP ID corresponding to one PFD. For example, each record may include a PFD identifier and an APP ID. The first correspondence list may be stored in the packet flow description function network element or another external storage device (for example, a data management network element (for example, a UDR)). The first correspondence list in an initial state may be empty, or may include some content predefined by an administrator, and the first correspondence list may be dynamically maintained by the packet flow description function network element subsequently. For example, the first correspondence list is stored in the packet flow description function network element. After a user subscribes to an application, an AF may directly provide, for the packet flow description function network element, a PFD corresponding to the application and an APP ID corresponding to the PFD. The packet flow description function network element adds, to the first correspondence list, the APP ID corresponding to the PFD. Alternatively, when the packet flow description function network element is independently deployed, an AF delivers, to a NEF, a PFD and an APP ID corresponding to the PFD. After verifying that the AF is a valid network element, the NEF delivers, to the packet flow description function network element, the received PFD and the received APP ID corresponding to the PFD. The packet flow description function network element adds, to the first correspondence list, the APP ID corresponding to the PFD.

For example, assuming that the packet flow description function network element is a PFDF, the first correspondence list stored in the PFDF is shown in Table 1, including three records: A PFD 1 corresponds to an APP ID 1, a PFD 2 corresponds to the APP ID 1, and a PFD 3 corresponds to an APP ID 2. If the PFDF determines that the PFD that matches the signature parameter of the service data flow is the PFD 1, the PFDF may determine, by looking up Table 1, that an APP ID corresponding to the PFD 1 is the APP ID 1. If the PFDF determines that the PFD that matches the signature parameter of the service data flow is the PFD 2, the PFDF may determine, by looking up the table, that an APP ID corresponding to the PFD 2 is the APP ID 1. If the PFDF determines that the PFD that matches the signature parameter of the service data flow is the PFD 3, the PFDF may determine, by looking up Table 1, that an APP ID corresponding to the PFD 3 is the APP ID 2.

TABLE 1

| PFD identifier | APP ID |
|---|---|
| PFD 1 | APP ID 1 |
| PFD 2 | APP ID 1 |
| PFD 3 | APP ID 2 |

In another possible design, before the packet flow description function network element matches the signature parameter of the service data flow with the at least one PFD, the packet flow description function network element checks a second correspondence list to determine whether a correspondence between the signature parameter of the to-be-queried service data flow and an APP ID exists in the second correspondence list. If the packet flow description function network element determines that the correspondence between the signature parameter of the to-be-queried service data flow and the APP ID exists, the packet flow description function network element directly uses the APP ID that corresponds to the signature parameter of the to-be-queried service data flow and that is in the second correspondence list, as the APP ID corresponding to the service data flow. On the contrary, if the packet flow description function network element determines that the correspondence between the signature parameter of the to-be-queried service data flow and the APP ID does not exist, the packet flow description function network element matches the signature parameter of the to-be-queried service data flow with the at least one PFD, to determine the PFD that matches the signature parameter of the to-be-queried service data flow; and determines, based on the matched PFD and the correspondence between the PFD and the APP ID, the APP ID corresponding to the matching PFD, and uses the APP ID corresponding to the matching PFD as the APP ID corresponding to the service data flow. It should be noted that in this disclosure, for ease of description, the signature parameter of the service data flow is referred to as the signature parameter of the to-be-queried service data flow, where the signature parameter of the service data flow is carried in the query request.

The second correspondence list may be used to record a correspondence that has been identified by the packet flow description function network element and that is between a signature parameter of a service data flow and an APP ID, or a correspondence that has been identified by the packet flow description function network element and that is between a hash value of a signature parameter of a service data flow and an APP ID. The hash value may be obtained through calculation based on a hash algorithm. The hash algorithm may be an algorithm specified in a protocol. In the embodiments of this disclosure, the hash value of the signature parameter of the service data flow may be replaced with another signature value (for example, a value obtained based on another agreed-upon algorithm) used to represent the service data flow. The second correspondence list may be stored in the packet flow description function network element or the another external storage device (for example, the UDR). The second correspondence list in an initial state may be empty, or may include some content predefined by the administrator, and the second correspondence list may be dynamically maintained by the packet flow description function network element subsequently. For example, after identifying the APP ID corresponding to the service data flow, the packet flow description function network element may add, to the second correspondence list, a correspondence between a signature parameter of a service data flow 1 and an APP ID 1, or a correspondence between a hash value 1 of a signature parameter of a service data 1 and an APP ID 1. This is not limited in this disclosure.

When receiving a query request including the signature parameter of the service data flow again subsequently, the packet flow description function network element may check the second correspondence list to determine the APP ID corresponding to the service data flow. In this case, the packet flow description function network element does not need to perform PFD matching and determine, based on the matched PFD and the first correspondence list, the APP ID corresponding to the service data flow. This reduces processing consumption of the packet flow description function network element.

For example, assuming that the packet flow description function network element is the PFDF, the second correspondence list stored in the PFDF is shown in Table 2, and records correspondences between hash values of signature parameters of a plurality of service data flows and APP IDs corresponding to the service data flows. After receiving a signature parameter of a service data flow 1, the PFDF first calculates a hash value 1 based on the hash algorithm; then determines, by looking up Table 2, that the hash value 1 exists in Table 2; and determines the APP ID 1 corresponding to the hash value 1 as an APP ID corresponding to the service data flow 1. After receiving a signature parameter of a service data flow 4, the PFDF first calculates a hash value 4 based on the hash algorithm; then determines, by looking up Table 2, that the hash value 4 does not exist in Table 2; determines the PFD 1 that matches the signature parameter of the service data flow 4; and determines, based on the matched PFD 1 and by looking up Table 1, that an APP ID corresponding to the PFD 1 is the APP ID 1, and uses the APP ID 1 as an APP ID corresponding to the service data flow 4.

TABLE 2

| Hash value of a signature parameter of a service data flow | APP ID |
|---|---|
| 1 | APP ID 1 |
| 2 | APP ID 1 |
| 3 | APP ID 2 |

Block 403: The packet flow description function network element sends a query response to the first network element, and the first network element receives the query response sent by the packet flow description function network element.

The query response may carry the APP ID corresponding to the service data flow. The query response corresponds to the query request. For example, if the query request is a request message of a special message type used to indicate to query the APP ID, the query response may be a response of a special message type used to indicate an APP ID query result. If the query request is a session report request, the query response may be a session report response. If the query request is a node report request, the query response may be a node report response.

In a possible design, when the first network element is the session management network element, the query response may further carry a forwarding indication, and the forwarding indication is used to indicate the session management network element to send, to the user plane network element, the APP ID corresponding to the service data flow.

The packet flow description function network element may send the query response to the first network element through the communications interface of the first network element. For example, the packet flow description function network element may obtain an address of the communications interface of the first network element, and send the query response to the first network element based on the address of the communications interface. The communications interface of the first network element is connected to the communications interface of the packet flow description function network element, and the address of the communications interface of the first network element may be preconfigured for the packet flow description function network element. Alternatively, the communications interface of the first network element may be resource-based. An address of the resource-based communications interface is a URL address, and the packet flow description function network element may send a get request to the URL address, to send the query response to the first network element.

Optionally, when the first network element sends a plurality of query requests, the packet flow description function network element may send a plurality of query responses to the first network element. In this case, to distinguish between the query responses corresponding to the query requests, when sending a query request, the first network element further includes a parameter (or a string) in the query request. After querying an APP ID, the packet flow description function network element sends, to the first network element, a query response that carries the parameter (or the string), and the first network element determines, based on the parameter (or the string), the query request associated with the received query response. The parameter may be a number or another symbol. This is not limited in this disclosure. Different query requests may carry different parameters.

For example, the first network element is a UPF, and the packet flow description function network element is the PFDF. It is assumed that the UPF sends, to the PFDF, three query requests: a query request 1 to a query request 3. The query request 1 carries a number 1, the query request 2 carries a number 2, and the query request 3 carries a number 3. When the PFDF performs processing based on the received query requests and returns a query response 1 to a query response 3 to the UPF, the PFDF may include the number 1 in the query response 1, the number 2 in the query response 2, and the number 3 in the query response 3. In this way, the query request 1 is associated with the query response 1, the query request 2 is associated with the query response 2, and the query request 3 is associated with the query response 3.

It should be noted that, if the packet flow description function network element does not find the APP ID corresponding to the service data flow in block 402, the query response does not carry the APP ID corresponding to the service data flow. In this case, the query response may be used to indicate that APP ID query fails. For example, the query response may carry a failure indication, and the failure indication is used to indicate that the APP ID query fails.

According to the method shown in FIG. 4, the first network element sends the query request to the packet flow description function network element, and the packet flow description function network element queries the APP ID corresponding to the service data flow and feeds back the APP ID to the first network element. In other words, the packet flow description function network element performs a function of identifying the APP ID, and the first network element does not need to store a PFD and an APP ID corresponding to the PFD, and does not need to find, through matching, the PFD corresponding to the signature parameter of the service data flow. This reduces resource consumption of the first network element.

Figure 5:
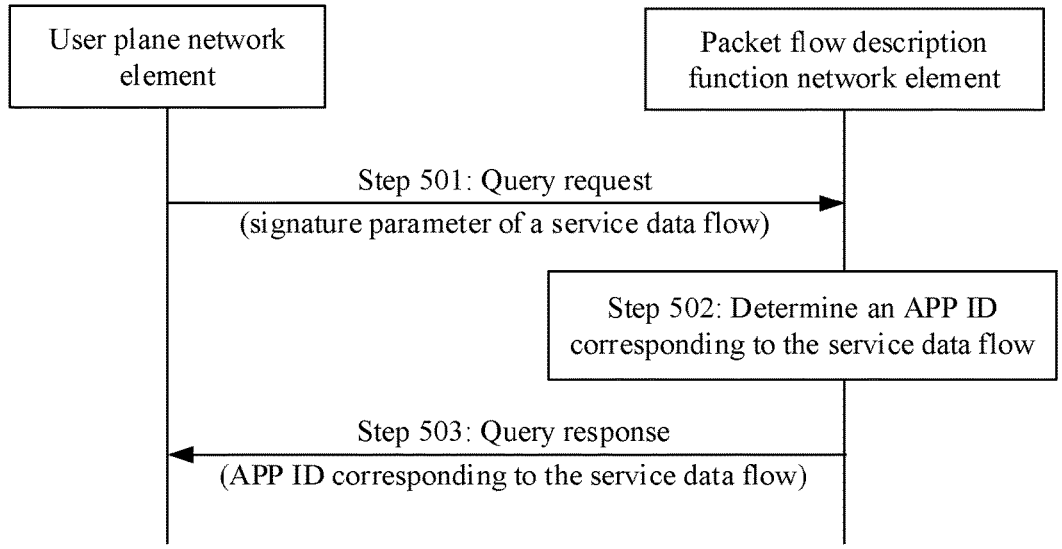
FIG. 5 is a flowchart of another method for identifying an APP ID according to an embodiment of this disclosure.

With reference to FIG. 5, the following describes the solution shown in FIG. 4 by using an example in which a first network element is the user plane network element in FIG. 2. Alternatively, with reference to FIG. 6, the following describes the solution shown in FIG. 4 by using an example in which a first network element is the session management network element in FIG. 2.

FIG. 5 is a flowchart of a method for identifying an APP ID according to an embodiment of this disclosure. The method is performed through interaction between a user plane network element and a packet flow description function network element. As shown in FIG. 5, the method includes block 501 to block 503.

Block 501: The user plane network element sends a query request to the packet flow description function network element.

For a related description of the query request, refer to the description in block 401. For a related description of block 501, refer to the description in block 401. Details are not described again.

Block 502: The packet flow description function network element receives the query request, and determines an APP ID corresponding to a PFD that matches a signature parameter of the service data flow, as an APP ID corresponding to a service data flow.

For a related description of block 502, refer to the description in block 402. Details are not described again.

Block 503: The packet flow description function network element sends a query response to the user plane network element, and the user plane network element receives the query response.

For a related description of the query response, refer to the description in block 403. For a related description of block 503, refer to the description in block 403. Details are not described again.

According to the method shown in FIG. 5, the user plane network element sends the query request to the packet flow description function network element, and the packet flow description function network element queries the APP ID corresponding to the service data flow and feeds back the APP ID to the user plane network element. In this method, the packet flow description function network element performs a function of identifying the APP ID, and the user plane network element does not need to store a PFD and an APP ID corresponding to the PFD, and does not need to find, through matching, the PFD corresponding to the signature parameter of the service data flow. This reduces resource consumption of the user plane network element. In addition, in the method shown in FIG. 5, the user plane network element does not need to interact with the packet flow description function network element through another network element. This reduces signaling consumption caused by interaction through the another network element.

Optionally, before block 501, the method further includes:

The user plane network element determines that the user plane network element should identify the APP ID corresponding to the service data flow.

That the user plane network element determines that the user plane network element should identify the APP ID corresponding to the service data flow may include: When detecting that the user plane network element should execute a policy associated with the APP ID, the user plane network element determines that the user plane network element should identify the APP ID corresponding to the service data flow. For example, when the user plane network element performs a PCC rule matching procedure, if the user plane network element finds that PCC rules stored in the user plane network element include some PCC rules carrying the APP ID, the user plane network element determines that the user plane network element should identify the APP ID corresponding to the service data flow. In this way, when the user plane network element should identify the APP ID corresponding to the service data flow, the user plane network element may send the query request to the packet flow description function network element. This avoids signaling interaction burden caused by blindly sending the query request to the packet flow description function network element.

Further, after block 503, the method may further include:

The user plane network element stores a correspondence between the APP ID corresponding to the service data flow and the signature parameter of the service data flow. Alternatively, the user plane network element stores a correspondence between the APP ID corresponding to the service data flow and a signature value of the service data flow. The signature value is used to represent the service data flow, and the signature value is obtained based on the signature parameter of the service data flow. For example, hash (HASH) calculation may be performed on the signature parameter of the service data flow to obtain the signature value. In this way, one signature value is used to replace a plurality of signature parameters of the service data flow. This reduces storage pressure.

The correspondence between the APP ID corresponding to the service data flow and the signature parameter of the service data or the correspondence between the APP ID corresponding to the service data flow and the signature value may be stored in a local cache of the user plane network element. Subsequently, when receiving a same type of service data flow again, the user plane network element may determine, based on the stored correspondence, the APP ID corresponding to the service data flow, instead of interacting with the packet flow description function network element to determine the APP ID corresponding to the service data flow. This reduces burden caused by signaling interaction between the network elements, and burden caused by querying the APP ID by the packet flow description function network element.

For example, after the user plane network element determines that the user plane network element should identify the APP ID corresponding to the service data flow, and before the user plane network element sends the query request to the packet flow description function network element, the method may further include:

The user plane network element queries the local cache to detect whether the APP ID corresponding to the service data flow exists in the local cache.

If the APP ID corresponding to the service data flow exists in the local cache, the user plane network element directly determines the APP ID corresponding to the service data flow, and does not perform block 501; otherwise, the user plane network element performs block 501.

For example, the local cache stores a correspondence between an APP ID and a signature parameter of a service data flow. That the user plane network element detects whether the APP ID corresponding to the service data flow exists in the local cache may include: The user plane network element checks the correspondence stored in the local cache, and if there is a signature parameter the same as the signature parameter of the service data flow, the user plane network element determines that the APP ID corresponding to the service data flow exists in the local cache. For example, the local cache stores a correspondence between an APP ID and a signature value of a service data flow. That the user plane network element detects whether the APP ID corresponding to the service data flow exists in the local cache may include: The user plane network element obtains the signature value of the service data flow through calculation based on a hash algorithm and checks the correspondence stored in the local cache, and if there is a signature value the same as the signature value obtained through calculation, the user plane network element determines that the APP ID corresponding to the service data flow exists in the local cache.

Figure 6:
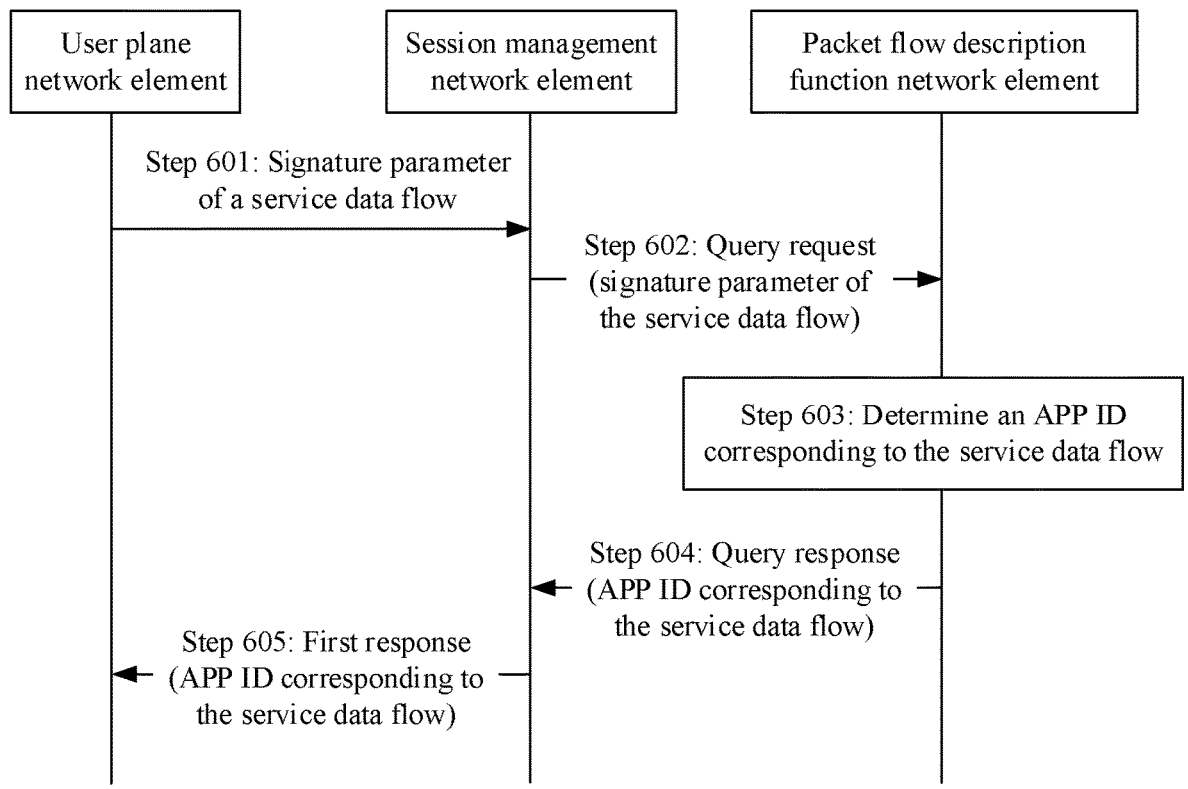
FIG. 6 is a flowchart of still another method for identifying an APP ID according to an embodiment of this disclosure.

FIG. 6 is a flowchart of a method for identifying an APP ID according to an embodiment of this disclosure. The method is performed through interaction between a user plane network element, a session management network element, and a packet flow description function network element. As shown in FIG. 6, the method includes block 601 to block 605.

Block 601: The user plane network element sends a signature parameter of a service data flow to the session management network element.

For information included in the signature parameter of the service data flow, refer to the description in block 401. Details are not described again.

Optionally, the signature parameter of the service data flow is carried in a first request, and the first request is used to request to query an APP ID corresponding to the service data flow. A form of the first request may be the same as or different from a form of the foregoing query request.

For example, in a possible design, the first request is the foregoing query request. In this case, the first request further carries a forwarding indication, and the forwarding indication is used to indicate the session management network element to forward the first request to the packet flow description function network element. In another possible design, the first request is a request of a special message type. The message type is used to indicate to query the APP ID. After receiving the first request, the session management network element determines, based on the message type of the first request, to query the APP ID corresponding to the service data flow, and performs block 602. In still another possible design, the first request further carries indication information used to indicate to identify the APP ID corresponding to the service data flow. After receiving the first request, the session management network element determines, based on the indication information, the APP ID corresponding to the service data flow, and performs block 602.

In a 5G system, the user plane network element may send, to the session management network element through an N4 interface, the first request that carries the signature parameter of the service data flow. In a 4G system, the user plane network element may send, to the session management network element through a Gx interface, the first request that carries the signature parameter of the service data flow.

Block 602: The session management network element sends, based on the received signature parameter of the service data flow, a query request to the packet flow description function network element.

For a related description of the query request and a process in which the session management network element sends the query request to the packet flow description function network element, refer to the descriptions in block 401. Details are not described again.

Specifically, the session management network element may send the signature parameter of the service data flow to the packet flow description function network element through a service-based interface between the session management network element and the packet flow description function network element. The service-based interface may be Npfdf. An address of the service-based interface may be preconfigured for the session management network element. Alternatively, the service-based interface may be resource-based. The address of the service-based interface that is resource-based is a URL address, and the session management network element may send a get request to the URL address, to query the APP ID corresponding to the service data flow.

Block 603: The packet flow description function network element receives the query request, and determines an APP ID corresponding to a PFD that matches the signature parameter of the service data flow, as the APP ID corresponding to the service data flow.

For a related description of block 603, refer to the description in block 402. Details are not described again.

Block 604: The packet flow description function network element sends a query response to the session management network element.

The query response may carry the APP ID corresponding to the service data flow.

In a possible design, the query response further carries a forwarding indication, and the forwarding indication is used to indicate the session management network element to forward the received query response to the user plane network element. After receiving the query response, the session management network element forwards the query response to the user plane network element based on the forwarding indication, that is, performs block 605.

In another possible design, the query response is a message of a special message type. For example, the message type is used to indicate the session management network element to forward, to the user plane network element, the query response received from the packet flow description function network element. After receiving the query response of the message type, the session management network element forwards the query response to the user plane network element, that is, performs block 605.

The packet flow description function network element may send the query response to the session management network element through the service-based interface between the session management network element and the packet flow description function network element.

Block 605: The session management network element receives the query response, and sends a first response to the user plane network element.

The first response may carry the APP ID corresponding to the service data flow. A form of the first response may be the same as or different from a form of the query response in block 604.

In the 5G system, the session management network element may send the first response to the user plane network element through the N4 interface. In the 4G system, the session management network element may send the first response to the user plane network element through the Gx interface.

It should be noted that, if the packet flow description function network element does not find the APP ID corresponding to the service data flow in block 603, the packet flow description function network element sends a failure indication to the session management network element, to indicate that APP ID query fails. The session management network element receives the failure indication, and sends the failure indication to the user plane network element.

According to the method shown in FIG. 6, the user plane network element sends the signature parameter of the service data flow to the packet flow description function network element through the session management network element. The packet flow description function network element determines the APP ID corresponding to the PFD that matches the signature parameter of the service data flow, as the APP ID corresponding to the service data flow, and feeds back the determined APP ID to the user plane network element through the session management network element. In this method, the packet flow description function network element performs a function of identifying the APP ID, and the user plane network element does not need to store a PFD and an APP ID corresponding to the PFD, and does not need to find, through matching, the PFD corresponding to the signature parameter of the service data flow. This reduces resource consumption of the user plane network element. In addition, in the method shown in FIG. 6, an existing system architecture is used to implement identification of the APP ID, and there is no need to change the existing system architecture. This reduces network deployment complexity.

Optionally, before block 601, the method further includes the following:

The user plane network element determines to identify the APP ID corresponding to the service data flow.

Specifically, for a process in which the user plane network element determines to identify the APP ID corresponding to the service data flow, refer to FIG. 5. Details are not described again.

Further, after block 605, the method may further include the following:

The user plane network element stores a correspondence between the APP ID corresponding to the service data flow and the signature parameter of the service data flow.

Alternatively, the user plane network element stores a correspondence between the APP ID corresponding to the service data flow and a signature value of the service data flow.

Specifically, for a related description of the further optional process, refer to a description shown in FIG. 5. Details are not described herein.

The foregoing mainly describes the solutions provided in the embodiments of this disclosure from a perspective of interaction between network elements. It may be understood that, to implement the foregoing functions, the network elements such as the packet flow description function network element, the user plane network element, and the session management network element include corresponding hardware structures and/or software modules for performing the functions. A person skilled in the art should easily be aware that, in combination with the examples described in the embodiments disclosed in this specification, algorithms blocks can be implemented by hardware or a combination of hardware and computer software in this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 7:
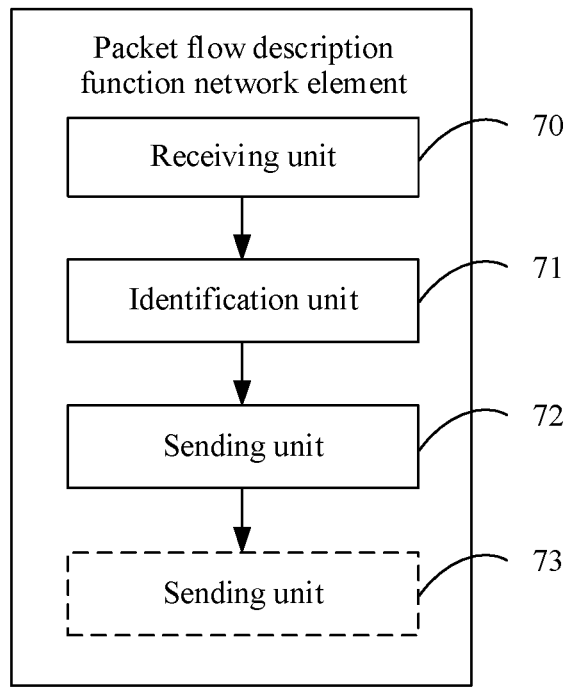
FIG. 7 is a schematic diagram of composition of a packet flow description function network element according to an embodiment of this disclosure.

FIG. 7 is a schematic diagram of possible composition of a packet flow description function network element. The packet flow description function network element may be configured to perform functions of the packet flow description function network element in the foregoing embodiments. As shown in FIG. 7, the packet flow description function network element may include a receiving unit 70, an identification unit 71, and a sending unit 72.

The receiving unit 70 is configured to receive a query request that carries a signature parameter of a service data flow. For example, the receiving unit 70 supports the packet flow description function network element in performing block 401, block 501, or block 602.

The identification unit 71 is configured to determine an APP ID corresponding to a PFD that matches the signature parameter of the service data flow, as an APP ID corresponding to the service data flow. For example, the identification unit 71 is configured to support the packet flow description function network element in performing block 402, block 502, or block 603.

The sending unit 72 is configured to send a query response that carries the APP ID corresponding to the service data flow. For example, the sending unit 72 is configured to support the packet flow description function network element in performing block 403, block 503, or block 604.

Further, the packet flow description function network element shown in FIG. 7 may further include a storage unit 73. The storage unit 73 is configured to store a correspondence between the signature parameter of the service data flow and the determined APP ID.

It should be noted that all related content of the blocks in the foregoing method embodiments may be cited in function descriptions of corresponding function modules. Details are not described herein again. The packet flow description function network element provided in this embodiment of this disclosure is configured to perform the method for identifying an APP ID, and therefore can achieve a same effect as that achieved by the method for identifying an APP ID.

In another possible structure, the packet flow description function network element may be a communications apparatus including a processing module and a communications module. The communications apparatus exists in a product form of a chip. The processing module may implement functions of the identification unit 71 and the storage unit 73, and the communications module may implement functions of the receiving unit 70 and the sending unit 72. For example, the processing module is configured to support the apparatus in performing block 402, block 502, block 603, and other processes of the technologies described in this specification. The communications module is configured to support the apparatus in communicating with another network entity, for example, communicating with the function modules or the network entities shown in FIG. 2. The apparatus may further include a storage module. The storage module is configured to store program code and data of the apparatus.

The processing module may be a processor or a controller. The processing module may implement or execute various example logical blocks, modules, and circuits described with reference to content disclosed in this disclosure. The processor may be a combination implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this disclosure may be the communications device shown in FIG. 3.

Figure 8:
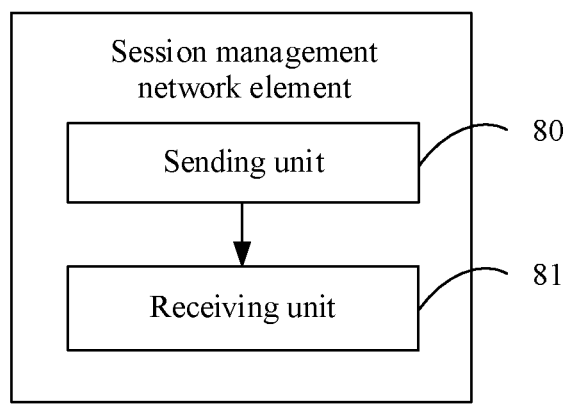
FIG. 8 is a schematic diagram of composition of a session management network element according to an embodiment of this disclosure.

FIG. 8 is a schematic diagram of possible composition of a session management network element. The session management network element may be configured to perform functions of the session management network element in the foregoing embodiments. As shown in FIG. 8, the session management network element may include a receiving unit 80 and a sending unit 81.

The receiving unit 80 is configured to receive a signature parameter a service data flow, where the signature parameter the service data flow is sent by a user plane network element. For example, the receiving unit 80 is configured to support the session management network element in performing block 601.

The sending unit 81 is configured to send, to a packet flow description function network element, a query request that carries the signature parameter of the service data flow. For example, the sending unit 81 is configured to support the session management network element in performing block 401 or block 602.

The receiving unit 80 is further configured to receive a query response that carries an APP ID corresponding to the service data flow and that is sent by the packet flow description function network element. For example, the receiving unit 80 is further configured to support the session management network element in performing block 403 or block 604.

The sending unit 81 is further configured to send, to the user plane network element, a first response that carries the APP ID corresponding to the service data flow. For example, the sending unit 81 is further configured to support the session management network element in performing block 605.

It should be noted that all related content of the blocks in the foregoing method embodiments may be cited in function descriptions of corresponding function modules. Details are not described herein again. The session management network element provided in this embodiment of this disclosure is configured to perform the method for identifying an APP ID, and therefore can achieve a same effect as that achieved by the method for identifying an APP ID.

In another possible structure, the session management network element may be a communications apparatus including a processing module and a communications module. The communications apparatus exists in a product form of a chip. The communications module may implement functions of the receiving unit 80 and the sending unit 81. The processing module is configured to support the apparatus in performing a process performed by the session management network element described in this specification. The communications module is configured to support the apparatus in communicating with another network entity, for example, communicating with the function modules or the network entities shown in FIG. 2. The apparatus may further include a storage module. The storage module is configured to store program code and data of the apparatus.

The processing module may be a processor or a controller. The processing module may implement or execute various example logical blocks, modules, and circuits described with reference to content disclosed in this disclosure. The processor may be a combination implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this disclosure may be the communications device shown in FIG. 3.

Figure 9:
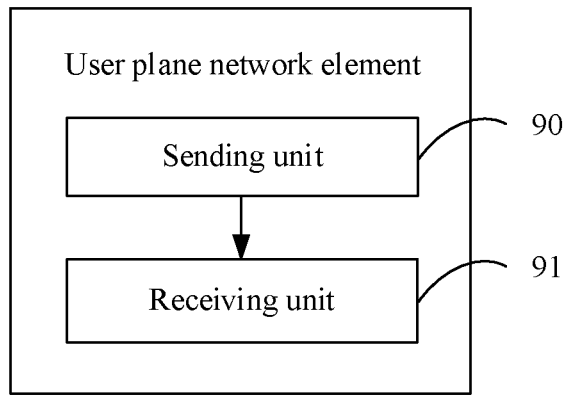
FIG. 9 is a schematic diagram of composition of a user plane network element according to an embodiment of this disclosure.

FIG. 9 is a schematic diagram of possible composition of a user plane network element. The user plane network element may be configured to perform functions of the user plane network element in the foregoing embodiments. As shown in FIG. 9, the user plane network element may include a sending unit 90 and a receiving unit 91.

The sending unit 90 is configured to send, to a packet flow description function network element, a query request that carries a signature parameter of a service data flow. For example, the sending unit 90 is configured to support the user plane network element in performing block 401 or block 501.

The receiving unit 91 is configured to receive a query response that carries an APP ID corresponding to the service data flow and that is sent by the packet flow description function network element. For example, the receiving unit 91 is configured to support the user plane network element in performing block 403 or block 503.

It should be noted that all related content of the blocks in the foregoing method embodiments may be cited in function descriptions of corresponding function modules. Details are not described herein again. The user plane network element provided in this embodiment of this disclosure is configured to perform the method for identifying an APP ID, and therefore can achieve a same effect as that achieved by the method for identifying an APP ID.

In another possible structure, the user plane network element may be a communications apparatus including a processing module and a communications module. The communications apparatus exists in a product form of a chip. The communications module may implement functions of the receiving unit 80 and the sending unit 81. The processing module is configured to support the apparatus in performing the process performed by the user plane network element described in this specification. The communications module is configured to support the apparatus in communicating with another network entity, for example, communicating with the function modules or the network entities shown in FIG. 2. The apparatus may further include a storage module. The storage module is configured to store program code and data of the apparatus.

The processing module may be a processor or a controller. The processing module may implement or execute various example logical blocks, modules, and circuits described with reference to content disclosed in this disclosure. The processor may be a combination implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the apparatus in this embodiment of this disclosure may be the communications device shown in FIG. 3.

Figure 10:
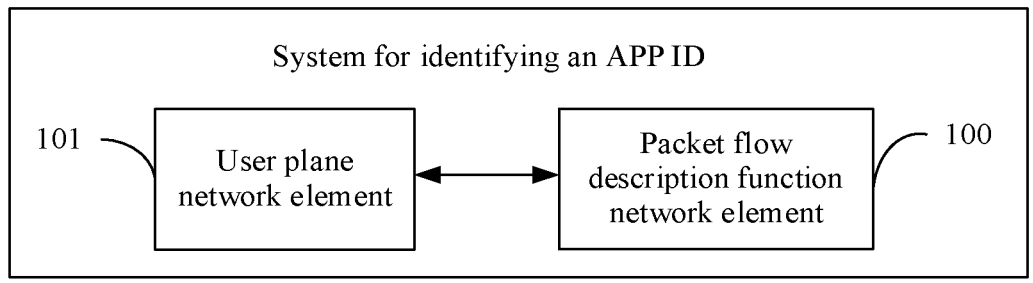
FIG. 10 is a schematic diagram of composition of a system for identifying an APP ID according to an embodiment of this disclosure.

FIG. 10 is a schematic diagram of composition of a system for identifying an APP ID according to an embodiment of this disclosure. As shown in FIG. 10, the system may include a packet flow description function network element 100 and a user plane network element 101. The packet flow description function network element 100 may be connected to the user plane network element 101. The packet flow description function network element 100 may send information to or receive information from the user plane network element 101 through a communications interface between the packet flow description function network element 100 and the user plane network element 101.

The packet flow description function network element 100 has a same function as the packet flow description function network element shown in FIG. 8. The user plane network element 101 has a same function as the user plane network element shown in FIG. 9. Details are not described again.

Based on the system shown in FIG. 10, the user plane network element 101 sends, to the packet flow description function network element 100, a query request that carries a signature parameter of a service data flow. The packet flow description function network element 100 receives the query request; determines an APP ID corresponding to a PFD that matches the service data flow, as an APP ID corresponding to the service data flow; and sends, to the user plane network element 101, the APP ID corresponding to the service data flow. In other words, the packet flow description function network element 100 performs a function of identifying the APP ID, and the user plane network element 101 does not need to store a PFD and an APP ID corresponding to the PFD, and does not need to find, through matching, the PFD corresponding to the signature parameter of the service data flow. This reduces resource consumption of the user plane network element 101. In addition, the user plane network element 101 directly interacts with the packet flow description function network element 100. This reduces signaling consumption caused by interaction through another network element.

Figure 11:
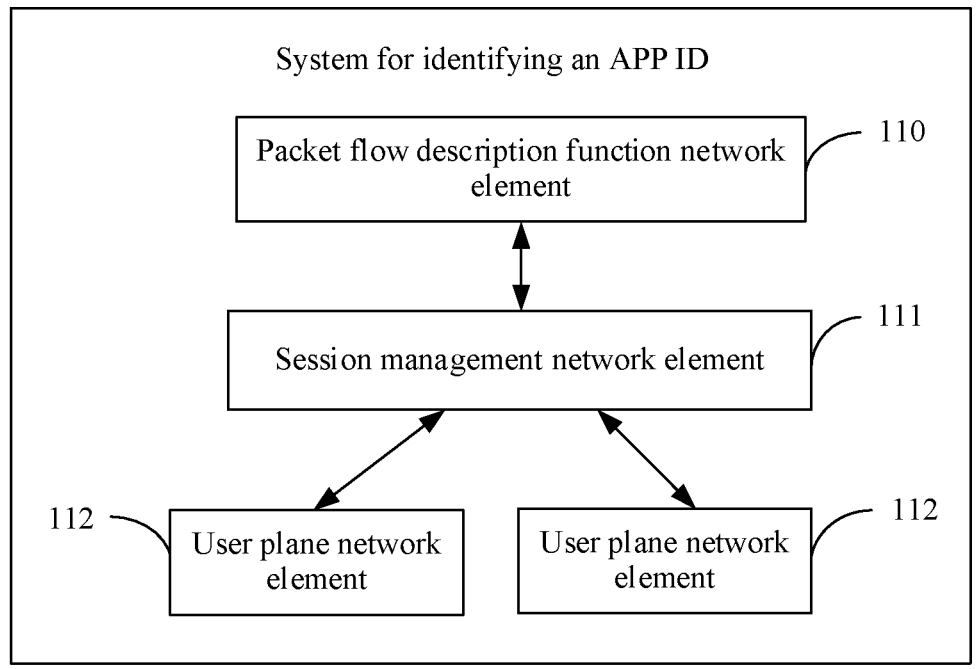
FIG. 11 is a schematic diagram of composition of another system for identifying an APP ID according to an embodiment of this disclosure.

FIG. 11 is a schematic diagram of composition of a system for identifying an APP ID according to an embodiment of this disclosure. As shown in FIG. 11, the system may include a packet flow description function network element 110, a session management network element 111, and a plurality of user plane network elements 112. The packet flow description function network element 110 is connected to the session management network element 111. The session management network element 111 may manage the plurality of user plane network elements 112, and is connected to the plurality of user plane network elements 112.

The packet flow description function network element 110 has a same function as the packet flow description function network element shown in FIG. 8. The session management network element has a same function as the session management network element shown in FIG. 9. Details are not described again. The user plane network element 112 is configured to: send a signature parameter of a service data flow to the session management network element 111, and receive an APP ID that corresponds to the service data flow and that is sent by the session management network element 111.

Based on the system shown in FIG. 11, the user plane network element 112 sends the signature parameter of the service data flow to the packet flow description function network element 110 through the session management network element 111. The packet flow description function network element 110 queries the APP ID corresponding to the service data flow, and feeds back, to the user plane network element 112 through the session management network element 111, the APP ID corresponding to the service data flow. In the system, the packet flow description function network element 110 performs a function of identifying the APP ID, and the user plane network element 112 does not need to store a PFD and an APP ID corresponding to the PFD, and does not need to find, through matching, a PFD corresponding to the signature parameter of the service data flow. This reduces resource consumption of the user plane network element 112. In addition, the system is compatible with an existing system architecture, and there is no need to change the existing system architecture. This reduces network deployment complexity.

The foregoing descriptions about implementations allow a person skilled in the art to understand that, for ease of description and brevity, division into the foregoing functional modules is merely used as an example for description. In actual application, the foregoing functions can be allocated to different modules and implemented based on a requirement. In other words, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one physical unit or a plurality of physical units, may be located in one position, or may be distributed on different positions. Some or all of the units may be selected based on actual requirements, to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this disclosure essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the blocks of the methods described in the embodiments of this disclosure. The storage medium includes any medium that can store program code, such as a USB flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A method for identifying an application identifier (APP ID), the method comprising:
   receiving, by a packet flow description function network element, a query request, wherein the query request comprises a signature parameter of a first service data flow, and the signature parameter is used to describe the first service data flow;
   determining, by the packet flow description function network element, a correspondence between a first APP ID and a first packet flow description (PFD) that matches the signature parameter, as an APP ID corresponding to the first service data flow; and
   responsive to determining the correspondence between the first APP ID and the first PFD, sending, by the packet flow description function network element, a query response, wherein the query response comprises the first APP ID,
   wherein determining the correspondence between the first APP ID and the first PFD that matches the signature parameter, as the APP ID corresponding to the first service data flow comprises:
      matching, by the packet flow description function network element, the signature parameter with at least one PFD, to determine that the first PFD matches the signature parameter; and
      determining, by the packet flow description function network element based on the first PFD and the correspondence between the first PFD and first APP ID, the first APP ID as the APP ID corresponding to the first service data flow.

2. The method of claim 1, wherein before matching, by the packet flow description function network element, the signature parameter with the at least one PFD, the method further comprises:
   determining, by the packet flow description function network element, that a correspondence between the signature parameter and an APP ID does not exist.

3. The method of claim 1, further comprising:
   storing, by the packet flow description function network element, a correspondence between the signature parameter and the first APP ID.

4. The method of claim 1, wherein receiving, by the packet flow description function network element, the query request comprises:
   receiving, by the packet flow description function network element, the query request from a user plane network element through a communications interface between the packet flow description function network element and the user plane network element; and
   wherein sending, by the packet flow description function network element, the query response comprises:
   sending, by the packet flow description function network element, the query response to the user plane network element through the communications interface.

5. The method of claim 1, wherein receiving, by the packet flow description function network element, the query request comprises:
   receiving, by the packet flow description function network element, the query request from a session management network element through a service-based interface between the packet flow description function network element and the session management network element; and
   wherein sending, by the packet flow description function network element, the query response comprises:

sending, by the packet flow description function network element, the query response to the session management network element through the service-based interface.

6. The method of claim 5, wherein:
the query response further comprises a forwarding indication, and the forwarding indication is used to indicate the session management network element to send the first APP ID to a user plane network element.

7. The method of claim 1, wherein:
the packet flow description function network element is deployed in a network exposure function network element.

8. The method of claim 1, further comprising:
receiving, by the packet flow description function network element from an application function network element, the first PFD and first APP ID corresponding to the first PFD, and storing the correspondence between the first PFD and the first APP ID.

9. The method of claim 1, wherein:
the signature parameter comprises one or more of: a 5-tuple of the first service data flow, a uniform resource locator (URL) of the first service data flow, or a domain name of the first service data flow.

10. A system for identifying an application identifier (APP ID), the system comprising:
a first network element and a packet flow description function network element, wherein:
the first network element is configured to send a query request to the packet flow description function network element, wherein the query request comprises a signature parameter of a first service data flow, and the signature parameter is used to describe the first service data flow;
the packet flow description function network element is configured to: receive the query request; determine a correspondence between a first APP ID and a first packet flow description (PFD) that matches the signature parameter, as an APP ID corresponding to the first service data flow; and, responsive to determining the correspondence between the first APP ID and the first PFD, send a query response to the first network element, wherein the query response comprises the first APP ID; and
the first network element is further configured to receive the query response from the packet flow description function network element,
wherein the packet flow description function network element is further configured to:
match the signature parameter with at least one PFD, to determine that the first PFD matches the signature parameter; and
determine, based on the first PFD and the correspondence between the first PFD and the first APP ID, the first APP ID as the APP ID corresponding to the first service data flow.

11. The system of claim 10, wherein the packet flow description function network element is further configured to:

before matching the signature parameter with the at least one PFD, determine that a correspondence between the signature parameter and an APP ID does not exist.

12. The system of claim 10, wherein the packet flow description function network element is further configured to:
store a correspondence between the signature parameter and the first APP ID.

13. The system of claim 10, wherein the first network element is a user plane network element.

14. The system of claim 10, wherein the first network element is a session management network element, and the system further comprises a user plane network element and wherein:
the user plane network element is configured to send a first request to the first network element, wherein the first request comprises the signature parameter; and
the first network element is further configured to send a first response to the user plane network element, wherein the first response comprises the first APP ID.

15. The system of claim 10, wherein:
the packet flow description function network element is deployed in a network exposure function network element.

16. A packet flow description function network element comprising:
at least one processor; and
a memory coupled to the at least one processor and having instructions stored thereon which, when executed by the at least one processor, cause the packet flow description function network element to:
receive a query request, wherein the query request comprises a signature parameter of a first service data flow, and the signature parameter is used to describe the first service data flow;
determine a correspondence between a first APP ID and a first packet flow description (PFD) that matches the signature parameter, as an APP ID corresponding to the first service data flow; and
responsive to determining the correspondence between the first APP ID and the first PFD, send a query response, wherein the query response comprises the first APP
wherein the instructions further cause the packet flow description function network element to:
determine that a correspondence between the signature parameter and an APP ID does not exist before matching the signature parameter with the at least one PFD.

17. The packet flow description function network element of claim 16, wherein the instructions further cause the packet flow description function network element to:
match the signature parameter with at least one PFD to determine that the first PFD matches the signature parameter; and
determine, based on the first PFD and the correspondence between the first PFD and first APP ID, the first APP ID as the APP ID corresponding to the first service data flow.

* * * * *

UNITED STATES PATENT AND TRADEMARK OFFICE
CERTIFICATE OF CORRECTION

| | |
|---|---|
| PATENT NO. | : 11,438,425 B2 |
| APPLICATION NO. | : 17/100120 |
| DATED | : September 6, 2022 |
| INVENTOR(S) | : Xiang Hu and Yuan Xia |

It is certified that error appears in the above-identified patent and that said Letters Patent is hereby corrected as shown below:

In the Claims

In Claim 16, Column 34, Line 42, delete "first APP" and insert --first APP ID--.

Signed and Sealed this
Twentieth Day of December, 2022

Katherine Kelly Vidal
*Director of the United States Patent and Trademark Office*